United States Patent [19]
Bilz

[11] 3,793,912
[45] Feb. 26, 1974

[54] STUD DRIVER
[76] Inventor: Otto Bilz, Vogelsangstr. 8, Nellingen, Germany
[22] Filed: July 8, 1971
[21] Appl. No.: 160,605

[30] Foreign Application Priority Data
Aug. 12, 1970   Germany............................ 7030226

[52] U.S. Cl. ............................................... 81/52.3
[51] Int. Cl. ............................................. B25b 19/00
[58] Field of Search ................................... 81/52.3

[56] References Cited
UNITED STATES PATENTS
| 2,743,639 | 5/1956 | Lynch | 81/53.2 |
| 2,531,456 | 11/1950 | McKean | 81/53.2 |
| 2,516,288 | 7/1950 | Bagoon | 81/53.2 |
| 2,492,307 | 12/1949 | McKean | 81/53.2 |
| 1,807,265 | 5/1931 | Walker | 81/53.2 |
| 927,028 | 7/1909 | Errington | 81/53.2 |

FOREIGN PATENTS OR APPLICATIONS
| 920,402 | 3/1963 | Great Britain | 81/53.2 |

Primary Examiner—James L. Jones, Jr.
Attorney, Agent, or Firm—Craig and Antonelli

[57] ABSTRACT

A stud driver of a collet type in which the internally threaded front ends of the collet jaws are already in a substantially closed position when one end of a stud, the other end of which is held in a nonrotating position, is inserted between the jaws by being automatically screwed therein for a certain distance by the rotation of the collet, whereupon the stud will be rotated by the collet for screwing its other end into a workpiece. When this other end has been screwed for a certain distance into the workpiece, the forward movement of the rotating collet shaft is stopped by a stop on the machine, and the collet jaws although further rotated by the shaft are separated from the latter insofar as the stud, while being further screwed for a certain distance into the workpiece, will draw the jaws out of a coupling on the shaft so that the further rotation of the jaws and thus also the screwing of the stud into the workpiece will then be immediately stopped. When the collet is then withdrawn by the shaft from the stud, the collet jaws will again close immediately. They will then again be rotatably connected to the shaft due to the axial pressure which is exerted by a new stud upon the closed ends of the jaws for starting to screw this stud between the jaws.

22 Claims, 7 Drawing Figures

INVENTOR

OTTO BILZ

BY Craig, Antonelli & Hill

ATTORNEYS

INVENTOR
OTTO BILZ
BY Craig, Antonelli & Hill
ATTORNEYS

INVENTOR
OTTO BILZ

BY Craig, Antonelli & Hill

ATTORNEYS

STUD DRIVER

The present invention relates to a stud driver for screwing studs into workpieces, for example, into engine blocks, cylinder heads, gear housings, flanges, or the like.

Among the stud drivers which were known prior to this invention there are some in which the stud holder is provided with an internal screw thread into which one end of a stud has to be screwed before its other end is screwed into a workpiece. For thereafter removing the holder from the stud, the rotation of the stud driver must be reversed so as to unscrew the holder from the stud. Such a stud driver has not only the disadvantage that after screwing a stud into a workpiece, it requires additional time to again unscrew its holder from the stud but that, since this requires the direction of rotation of the stud holder to be reversed, it may easily occur that the stud holder may again unscrew the stud from the workpiece instead of being unscrewed from the stud. Another known type of stud driver is provided with a chuck or collet the jaws of which are adapted to be opened and closed and have internal thread sections which correspond to the thread on one end of a stud. For inserting this threaded end of a stud into the collet the jaws of the latter are opened and this end is pushed into and between the jaws, whereupon the jaws are closed so that their thread sections will then mesh with and grip the thread on the end of the stud. However, unless this end of the stud is inserted very accurately to a predetermined depth between the opened jaws, the thread sections of the latter will not properly mesh with the thread on the stud when the jaws are closed. Probably the least damage this will cause is that the thread on the end of the stud will be damaged.

The principal objects of the present invention are to provide a stud driver of a collet type which overcomes the disadvantages of the stud drivers according to previous constructions and which is designed so as first to permit a stud to be inserted into a guide part at the front end of the collet either by hand or to be picked up by or be inserted into this guide part automatically, then to permit each stud to pass to and to be screwed into the closed jaws of the collet and at the same time or subsequently thereto to be screwed into the workpiece either with a predetermined torque or so far that the stud will project for a certain distance from the workpiece, and to insure that neither the thread of the stud nor the thread parts of the collet jaws will be damaged in any manner either by the insertion of the stud into the collet or by the removal of the collet from the stud after it has been screwed into a workpiece.

For attaining these objects, it is an important feature of the invention that the collet is designed contrary to that of a stud driver of a known construction as above described so that the internally threaded front ends of the collet jaws will already be closed by means of locking balls before a stud is inserted between and screwed into these closed jaws, and that, when the stud has been screwed into a workpiece either with a predetermined torque or so as to project for a predetermined distance from the workpiece, the rotation of the collet jaws will be stopped and, when the collet is then being withdrawn from the workpiece, the threaded ends of the collet jaws will be automatically spread apart or opened by the locking balls to such an extent as to disengage completely from the stud. Immediately thereafter, the jaws will again be closed by the action of a return spring so as to be ready for the insertion of a new stud.

In order to permit each stud to be easily inserted into the collet jaws either by hand or automatically in a position in accurate axial alignment with the closed collet jaws so as to insure that the stud will be properly screwed into the jaws, the front end of the collet is provided in front of the jaws with a guide or clamping bushing into which the stud is first inserted.

Another feature of the invention consists in providing the stud driver with a length compensating device which is responsive to pressure. Such a device is especially of advantage if it is associated with each collet of a multiple-spindle stud driving machine so as to permit a plurality of studs to be screwed equally and simultaneously into a workpiece.

The stud driver according to the invention may either be mounted on and driven by the drive shaft or spindle of a portable machine or of a machine which is mounted in a fixed position, for example, for use in a production line, and such a machine may be of any suitable conventional type, for example, in the form of a pneumatic drill.

These as well as numerous additional features and advantages of the present invention will become further apparent from the following detailed description thereof which is to be read with reference to the accompanying drawings, in which FIG. 1 shows a longitudinal section of a stud driver collet according to a first embodiment of the invention, into which one end of a stud has been inserted which is thereafter to be screwed into the collet jaws;

FIG. 5 shows a longitudinal section of a stud driver collet according to a second embodiment of the invention; while

Figure 1:
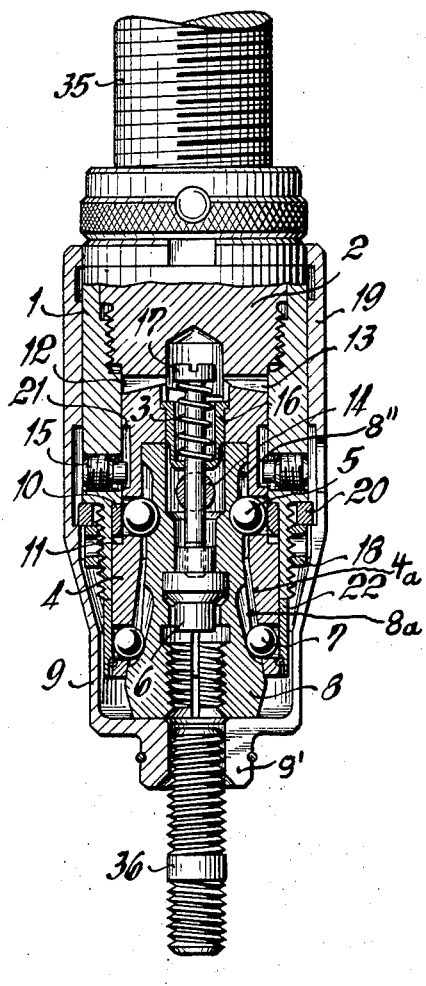

Referring first particularly to FIGS. 1 to 4 of the drawings, the stud driver according to the invention comprises a shaft 35 which is adjustably connected to the drive spindle of the machine (not shown), for example, by an adjusting nut and a lock nut and preferably integrally to a drive member 2 to which a cylindrical casing 1 of a collet is connected, for example, by being screwed thereon. Along the inner wall of casing 1 a jaw housing 4 is movable in its longitudinal direction. This jaw housing 4 has an inverted cup shape and is provided with an outer peripheral groove 21 into which the ends of grub screws 15 engage which are screwed in radial directions into the casing 1 and are adapted to limit the extent of the axial movements of the jaw housing 4 relative to casing 1.

Jaw housing 4 contains two collet jaws 8 which are longitudinally divided by diametrically opposite slots and the front parts of which are provided with internal thread sections which have a pitch corresponding to that of a stud 36 which is to be screwed into the threaded front parts of jaws 8 when closed. At the rear of these front parts the axial bore in jaws 8 has a recessed or enlarged part which contains a stop member 6 which limits the depth to which stud 36 may be screwed into the jaws 8. This stop member 6 is extended toward the rear by a cylindrical screw 17 which projects through a bore in a transverse pivot pin 14 the opposite ends of which project into recesses in the walls of the two jaws 8 and on which these jaws are pivotable relative to each other. Screw 17 is surrounded by a return spring 3 one end of which engages upon the head of this screw, while its other end engages upon the bottom of a socketlike bushing 16 which is fitted into the rear end of jaw housing 4 and the lower end of which has an outer diameter smaller than the axial bore in the rear end of jaws 8 so as to be axially movable into and out of this bore.

Figure 2A:
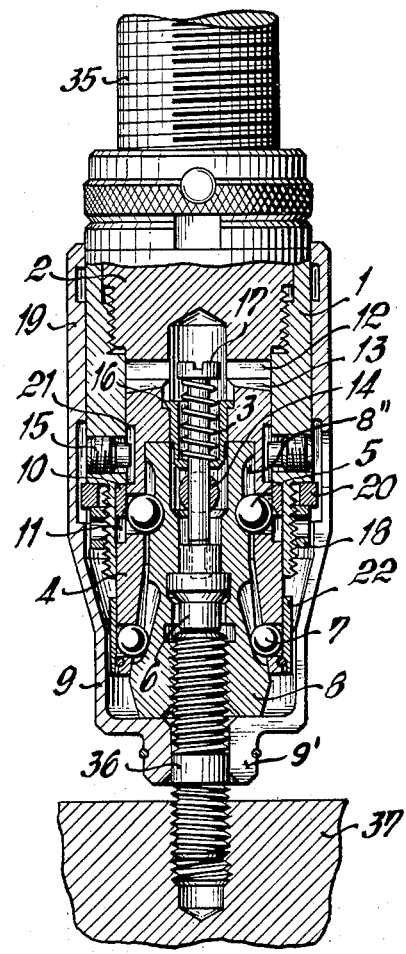
FIG. 2a is a longitudinal sectional view of the collet of FIG. 1 illustrating an operating position thereof in which the collet elements are located while a stud is being screwed into a workpiece.
Figure 3:
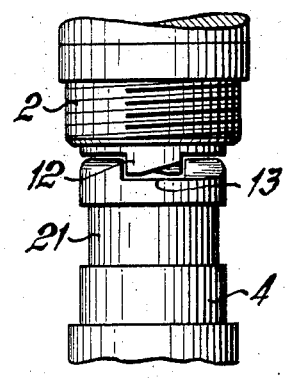
FIG. 3 shows a side view of a part of the collet in the position as shown in FIG. 1.
Figure 4:
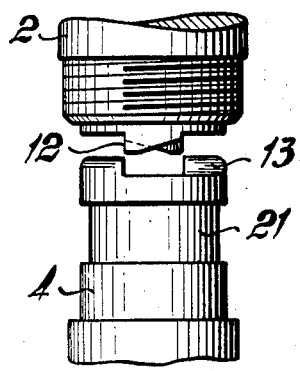
FIG. 4 shows a side view of the same collet part, but in the position as shown by the left part b of FIG. 2.

The front end surface of drive member 2 is provided with driving cams 12 which, as shown particularly in FIGS. 3 and 4, are adapted to engage into or to be retracted from associated cams 13 in the opposite rear end surface of the jaw housing 4. This jaw housing is further provided with radial bores into which locking balls 5 are inserted which, when jaw housing 4 is in the position as shown in FIG. 1 or at the right part *a* of FIG. 2, engage into diametrically opposite, substantially hemispherical recesses 8' in the outer peripheral surface of the rear parts of jaws 8, or, when jaw housing 4 is shifted toward the rear to the position as shown at the left part of FIG. 2 (*b*) are pushed out of these hemispherical recesses and shifted by means of jaw housing 4 along shallower grooves 8'' at the rear of these recesses and extending in the axial direction of the collet. As may be seen by a comparison of the right part *a* with the left part of *b* of FIG. 2, the common central plane of these hemispherical recesses 8' is located forwardly of the axis of pivot pin 14 so that, when the locking balls 5 are pressed into these recesses in the manner as subsequently described, the threaded front parts of jaws 8 will be closed while when the balls 5 are shifted by the jaw housing 4 to the rear end of the grooves 8'' and are thus located at the rear of the axis of pivot pin 14, the rear ends of jaws 8 are pivoted toward each other about pivot pin 14 so that the threaded front parts of the jaws will be pivoted away from each other and will thus be opened.

For pressing the locking balls 5 into the hemispherical recesses 8' in jaws 8 when the jaw housing 4 is in its position as shown in FIG. 1, a pressure ring 10 is fitted tightly into casing 1 at the rear end of an annular recess 11 in the peripheral surface of jaw housing 4.

Near its front end, jaw housing 4 is provided with transverse bores into which driving balls 7 are inserted which engage at the inner side into rearwardly tapering longitudinal grooves in the outer wall surfaces of jaws 8. Driving balls 7 are prevented from being forced outwardly from the transverse bores in housing 4 by a ring 22 which is fitted tightly over the front part of housing 4. These balls are provided in addition to the locking balls 5 for transmitting the rotation of shaft 35 through the casing 1 and housing 4 to the collet jaws 8.

Over the reduced front part of casing 1 a stop ring 20 is slipped which is held in a fixed position thereon, for example, by a threaded ring 18 which is screwed over this front part of casing 1. This stop ring 20 limits the axial movements between casing 1 and a guide sleeve 19 which is slipped over casing 1 and is held in the axial direction relative to casing 1 by stop ring 20.

The front part 9 of guide sleeve 19 is provided with longitudinal slots so that its front end 9' forms a resilient clamping bushing the axial bore of which has a diameter which is preferably slightly smaller than the outer diameter of stud 36, and has an end which is conically enlarged toward the outside so as to permit a stud 36 to be easily inserted into this bore. This slotted bushing 9' is preferably surrounded and pressed together by a spring ring so as to hold the stud tightly without, however, damaging its screw thread and without clamping the stud so tightly as to prevent it from being shifted under an axial pressure along the wall of the slotted bore in bushing 9'.

When the collet is in its basic position as shown in FIG. 1, one end of a stud 36 may be pushed by hand into bushing 9' in which it will at first be resiliently clamped. By means of this bushing 9' it is, however, also possible to pick up a stud from a supply stand or the like, for example, by moving the collet in its axial direction over one end of one of the studs on this stand so that bushing 9' will slide over this end of the stud. The end of stud 36 which is thus inserted into bushing 9'' will therefore at first not enter the gripping jaws 8.

When the front end of stud 36 is then set upon the outer end of a tapped bore in a workpiece 37 (FIG. 2) into which the stud is to be screwed by the collet, and the collet is then rotated, stud 36 will normally at first be screwed into the thread in the front end of jaws 8 which are pressed together by the locking balls 5, while at the same time a conical surface 8*a* of jaws 8 near their front end engages upon a conical inner surface 4*a* of housing 4. Stud 36 will then be screwed inwardly until its end surface abuts against the top member 6. During the further rotation of the collet, stud 36 will be taken along by the jaws 8 and screwed so far into the workpiece 37 until the forward movement of the collet is discontinued by a stop member (not shown) which has been preset accordingly in the machine which drives the shaft 35. This stop member insures that all studs of one series will be screwed to the same depth into the bores of a workpiece or a succession of workpieces and that the stud parts projecting from the workpiece or workpieces will all have the same length when the collet has been retracted from each stud.

When in the operation of the machine carrying the spindle for driving shaft 35 the forward movement of this shaft and of the collet thereon is stopped by an adjustable stop member and stud 36 is screwed for a certain distance into the workpiece 37, the further rotation of the collet will therefore occur while the forward movement of shaft 35 and the collet is stopped. Stud 36 will then be further screwed into the workpiece 37 and will thereby draw the jaw housing 4 forwardly and its cams 13 out of engagement with the cams 12 on drive member 2. As soon as cams 12 and 13 are separated from each other, the rotation of jaw housing 4 and jaws 8 will be stopped and stud 36 will therefore not be screwed any further into workpiece 37. While continuing its rotation, shaft 35 together with casing 1 will then be retracted by the machine. During this rearward movement of shaft 35 and casing 1 the pressure ring 10 will also be retracted and screws 15 will move toward the rear along the peripheral groove 21 until they abut against the rear end of this recess and therefore take along the jaw housing 4. At the same time, pressure ring 10 will be fully retracted from the locking balls 5. Due to the rearward movement of jaw housing 4, balls 5 will be forced out of the hemispherical recesses 8' and into the annular recess 11 and will be shifted at the same time along the longitudinal grooves 8'' up to the rear ends thereof and thus to a position behind the pivot pin 14. Jaws 8 will thereby be pivoted about this pin 14 and their threaded front ends will be fully opened and disengage entirely from stud 36. During this rearwardly movement of casing 1 together with jaw housing 4 jaws 8 will at first remain in a fixed position in the axial direction and the return spring 3 will therefore be compressed and tightened. Spring 3 will then retract the open jaws 8 from the stud 36 through screw 17 and stop member 6. While shaft 35 together with casing 1 is being retracted, the clamping bushing 9' will also be retracted from stud 36 by the engagement of stop ring 20 with the end shoulder of the annular recess in guide sleeve 19 in which this ring is slidable. The position of the collet when jaws 8 are opened, but before the collet is withdrawn from stud 36, is illustrated in FIG. 2b.

Figure 2B:
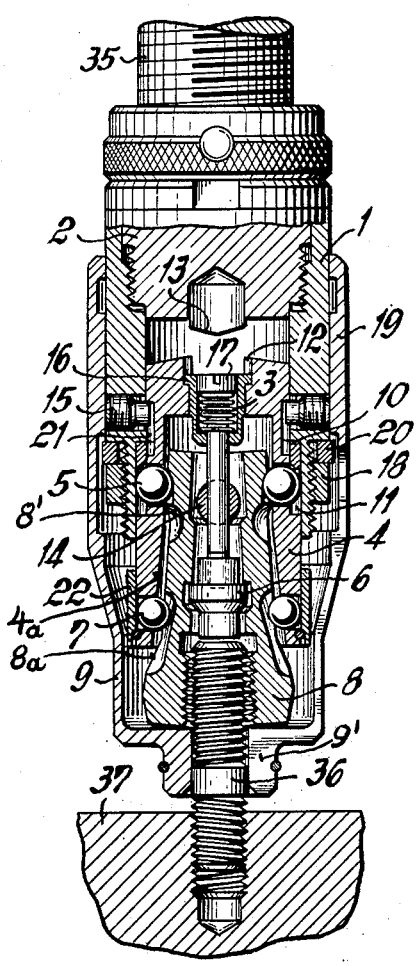
FIG. 2b is a longitudinal sectional view of the collet of FIG. 1 illustrating an operating position different from that of FIG. 2a in which the collet elements are located when a stud has been screwed into a workpiece and the collet jaws have been opened and when the collet is being withdrawn from the stud.

When the collet has been withdrawn from stud 36, jaw housing 4 will remain in the axial position as shown in FIG. 2b until another stud is inserted into or picked up by the clamping bushing 9'. The axial pressure which is then exerted by the new stud upon bushing 9' or vice versa shifts this bushing toward the rear. Bushing 9' then, in turn, shifts the jaws 8 relative to jaw housing 4 toward the rear until the balls 5 are again pressed into the hemispherical recesses 8' and thereby close the front ends of the jaws. The entire collet is then again in the position as shown in FIG 1, whereupon shaft 35 is again moved forwardly by the spindle of the machine so that cams 12 on drive member 2 will also move forwardly until by this axial movement and by their rotation they will engage with the associated cams 13 on jaw housing 4 and start the rotation of the jaw housing and jaws 8 into which the new stud 36 is then screwed.

From the foregoing description it is evident that it is an important feature of the invention that the collet has to be designed so that the locking balls 5 will not open the collet jaws 8 until the associated cams 12 and 13 are disengaged from each other and the jaw housing 4 is stopped, and that the rotation of jaw housing 4 by the driving member 2 will not occur until the jaws 8 are completely closed so that the stud 36 will then be screwed into the closed thread of the jaws.

Figure 5:
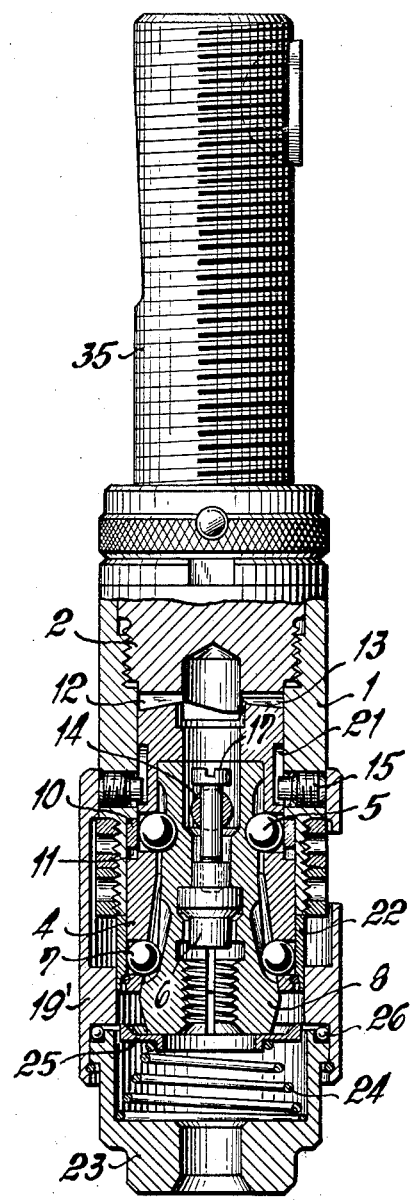

FIG. 5 illustrates a collet according to another embodiment of the invention which differs essentially from the collet as shown in FIGS. 1 and 2 only by being provided with a compression spring 24 in place of the return spring 3 and with a stop socket or bushing 23 in place of the clamping bushing 9'. This bushing 23 is provided with an axial bore the minimum diameter of which corresponds to the outer diameter of the stud which is to be inserted therein. These modifications permit the studs to be screwed into a workpiece until the front end of the collet, that is, the end surface of bushing 23 abuts against the workpiece. This construction is especially suitable for a portable stud driver, that is one which is driven by a portable machine, for example, a pneumatic hand drill.

In order to insure that when bushing 23 engages upon the surface of the workpiece its rotation will be immediately stopped so that this surface will not be damaged, bushing 23 while being guided by the front end of guide sleeve 19' is rotatable relative to the latter by means of a ball bearing 26 which is interposed between the rear end of bushing 23 and an inner shoulder on guide sleeve 19'. Bushing 23 is also removably connected to guide sleeve 19' so as to permit it to be exchanged for another of a different length since this length is dependent upon the length which the stud should project from the workpiece. Since the stud merely slides into the bore of bushing 23 and is not resiliently clamped thereby, the particular bushing should also have a bore of a diameter which is exactly in accordance with the outer diameter of the studs to be used.

Bushing 23 extends so far forwardly beyond the front ends of jaws 8 that the compression spring 24 may be inserted between these front ends and the inner bottom of bushing 23. One end of spring 24 then engages upon this bottom of bushing 23, while its other end engages upon a washer 25 which, in turn, engages upon the front surface of jaws 8.

The mode of operation of the collet according to FIG. 5 is the same as that of the collet according to FIGS. 1 and 2, except that, when the stud has been screwed into a workpiece and the collet has then been withdrawn from the stud, jaws 8 will again be shifted back to their original position by the compression spring 24.

Of course, instead of providing the return spring 24 in the stop bushing 23, it is also possible to provide the collet according to FIG. 5 with a return spring like the spring 3 as shown in FIGS. 1 and 2. When using a collet of the type as shown in FIG. 5, each stud is first to be screwed by hand for a short distance into the workpiece or into the jaws 8.

Figure 6:
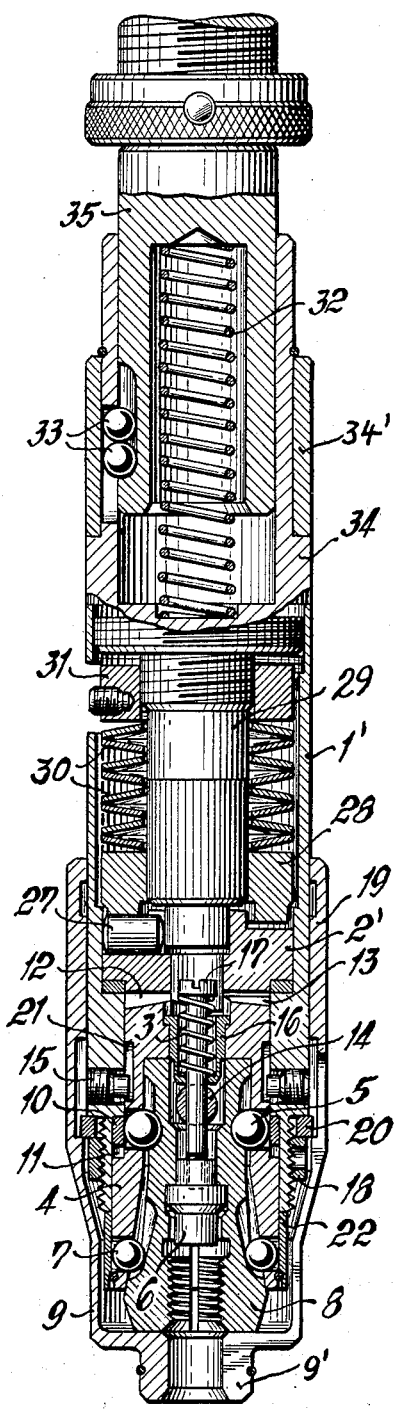
FIG. 6 shows a longitudinal section of a collet which is similar to the collet as shown in FIG. 1, but is additionally provided with a torque overload clutch and an axial length compensating device.

FIG. 6 illustrates a further embodiment of the invention which permits the studs to be screwed with a predetermined torque into the workpieces by providing the stud-driving collet with an adjustable torque control clutch. In addition, this collet is provided with a resilient pressure-responsive length compensating device which, hovver, may also form a part of the machine for driving a stud driver according to the invention. Such a length compensating device is especially of advantage when a plurality of studs are to be screwed equally and at the same time into a workpiece by a multiple-spindle machine.

The torque control clutch of the collet according to FIG. 6 comprises a set of cup springs 30 which surround and are axially slidable along a connecting member 29 which is secured to a tubular extension 34. The front end of this set of cup springs 30 acts upon an intermediate ring 28 which by means of splines is axially slidable along, but nonrotatable relative to the connecting member 29, and pressed by these springs upon pressure rollers 27 which, in turn, engage upon parts of the rear end surface of drive member 2' of the collet. The pressure which is to be exerted by the cup springs 30 through ring 28 upon the pressure rollers 27 and through the latter upon the drive member 2' is controlled and adjustable by a threaded adjusting ring 31 which is slipped over and screwed upon the connecting member 29 and presses upon the rear end of the set of springs 30. These springs and rings 28 and 31 are disposed within and covered by a part of casing 1' which is for this purpose extended toward the rear.

The torque which can be transmitted from shaft 35 upon drive member 2' is therefore determined by the particular position to which the adjusting ring 31 is adjusted in its axial direction. This means that all of the studs will be screwed equally tight into the workpiece or workpieces in accordance with the particular adjustment of ring 31. The other parts of the collet as illustrated in FIG. 6 which have not been mentioned above may be designed either in accordance with those of the collet as shown in FIGS. 1 to 4 or in FIG. 5.

The length compensating device with which the collet according to FIG. 6 is additionally provided with a compression spring 32 which serves as a compensating spring and is inserted into an axially extending bore in shaft 35 and into a tubular extension 34 of the connecting member 29 so that its opposite ends act upon the bottom of this bore and the bottom of this extension 34. Shaft 35 and the extension 34 are further provided with longitudinal grooves into which guide balls 33 are inserted which are held therein by a cover ring 34' and are movable therein in the axial direction of shaft 35 and are adapted to transmit the rotary movement of the shaft to the connecting member 29.

Due to the axial length compensation which may be attained by spring 32 it is also possible to screw several studs simultaneously into a workpiece by means of a multiple-spindle machine in which each spindle carries one of the collets and its associated means as described above. This resilient length compensation is also of advantage for picking up a stud automatically from a supply stand and for preventing a positive engagement of the clamping bushing 9' upon the face of the base of the supply stand. Furthermore, in the event that at a particular point of a workpiece where a stud should be inserted the required tapped bore has been omitted, the positive forward movement of the collet will be compensated by the length compensating spring 32 and the collet as well as the surface of the workpiece will not be damaged. This length compensating device may also be employed when omitting the torque control clutch, that is, by providing it on the collet itself, for example, if such or a similar clutch is built into the machine for driving the collet. In such an event, the drive member 2 or 2' would be directly connected to the connecting member 29.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A stud driver having a shaft adapted to be rotated in one direction and to be reciprocated in its axial direction and a collet connected to said shaft and comprising a jaw housing coaxial to said shaft, a plurality of elongated jaws within said housing and together extending coaxially to said housing, said jaws having internal thread sections in their inner front ends and longitudinal grooves in their peripherally outer sides, locking balls radially guided by said housing and partly projecting into said grooves and thus nonrotatably connecting said jaws to said housing and movable by said housing along said grooves, means for shifting said jaws and said housing axially relative to each other from a first position in which said jaws are substantially closed to a second open jaw position and vice versa, said locking balls in said first position pressing said threaded ends of said jaws toward each other to a substantially closed position of said ends so as to permit one end of a stud to be screwed from the outside for a certain distance into and between said threaded ends and also to permit the other end of said stud to be screwed for a certain distance into a tapped bore of a workpiece while said jaws are rotated due to the rotation of said shaft and are moved toward said workpiece at least partly due to the forward movement of said shaft, said locking balls in said second position when the ends of said stud have been screwed for the required distances into said jaws and into said tapped bore of said workpiece acting upon said jaws so as to spread apart said threaded front ends thereof to an open position in which, when said collet is being retracted by said shaft from said workpiece, said jaws are fully disengaged from said stud, said shifting means including means for moving said housing and said jaws relative to each other from said second to said first position independently and separately from the application of forces against said stud driver by said stud as soon as said collet has been retracted from said stud so that said locking balls again press said threaded ends into said first closed position.

2. A stud driver as defined in claim 1, in which said jaws are equally pivotable in their longitudinal directions relative to each other about a pivot point disposed within a rear part of said jaws and within the longitudinal axis of said shaft and jaw housing, said grooves extending longitudinally in said jaws from equal first positions in front of said pivot point to equal second positions at the rear of said pivot point so that in said first positions said jaws are pivoted by said locking balls to said substantially closed position of their threaded front ends, while in said second positions said jaws are pivoted by said balls to said open position of their front ends.

3. A stud driver as defined in claim 2, in which the inner peripheral sides of said jaws form wall portions of a bore extending axially from one end of said jaws to the other, and further comprisng a stop member within said bore and substantially immovably connected to said jaws in said axial direction but without affecting the pivotability of said jaws, the front end surface of said stop member limiting the depth to which a stud can be screwed into and between said threaded ends of said jaws when in said closed position, a socket mounted in the rear end of said housing, a headed screw extending through the bottom of said socket and axially slidable in said socket and extending through the rear part of said bore and screwed into the rear end of said stop member, and a return spring operatively disposed to moved said housing and said jaws axially relative to each other from said second to said first position so as to pivot said front ends of said jaws to said closed position as soon as said collet has been retracted from said stud.

4. A stud driver as defined in claim 3, in which said jaws consist of a pair of jaws having corresponding bearing recesses, a pivot member forming said pivot point of said jaws and having a central part and a pair of pins extending diametrically from said central part and into said bearing recesses so that said jaws are pivotable about said pins, said central part of said pivot member having a bore extending transverse to said pins, the shank of said screw extending slidably through said transverse bore.

5. A stud driver as defined in claim 3, in which said shaft has a tubular extension forming a casing surrounding and guiding said jaw housing during its axial movements relative to said shaft and said extension, said jaw housing having an annular recess in its outer peripheral surface, and grub screws screwed through transverse bores in the wall of said casing and extending into said annular recess for limiting the extent of the axial movements of said jaw housing.

6. A stud driver as defined in claim 5, in which said jaw housing has a second annular recess in its outer peripheral side and radial bores in each of which one of said locking balls is guided, a pressure ring secured to the inner wall of said casing, the front parts of said longitudinal grooves in said jaws having a greater depth than their rear parts and forming substantially hemispherical recesses, sad pressure ring pressing said locking balls into said hemispherical recesses when said jaw housing is shifted together with said locking balls from said second position to said first position forming the closed position of the front ends of said jaws, said pressure ring being retracted from said locking balls when said jaw housing is being shifted from said first position to said second position so as to permit said locking balls to be pulled by said jaw housing out of said hemispherical recesses and into said second annular recess and then to roll along the rear parts of said grooves toward their rear ends.

7. A stud driver as defined in claim 6, in which said jaw housing is provided with second radial bores near its front end, said jaws having conical outer surface parts near their front ends, and second longitudinal grooves in said conical surface parts each having a bottom extending at an oblique angle to the longitudinal axis of said collet so that the rear end of said groove bottom is disposed at a smaller radial distance from said axis than its front end, driving balls within said second radial bores and guided by the walls thereof and projecting into said second grooves and slidable along the same, and a ring fitted over the front end of said housing for maintaining said driving balls within said second radial bores and in said second grooves of said jaws, said driving balls nonrotatably connecting said housing to said jaws for driving the same.

8. A stud driver as defined in claim 6, further comprising an outer guide sleeve covering said casing, and a bushing connected to the front end of said guide sleeve and having an axial bore for receiving a stud before the latter is screwed into said jaws and for guiding said stud into said jaws.

9. A stud driver as defined in claim 6, further comprising a drive member connected to the front end of said shaft and to the rear end of said casing, associated cams on the front end of said drive member and on the rear end of said jaw housing adapted to interengage with each other to transmit the rotation of said shaft to said jaw housing, said cams on said jaw housing being drawn out of said cams on said drive member when the forward movement of said shaft is stopped and when said stud is further screwed into the workpiece by said jaws and said stud thereby takes along said jaws and said jaw housing, said rotation of said jaws and jaw housing and any further screwing of said stud into said workpiece being stopped as soon as said associated cams are separated from each other.

10. A stud driver as defined in claim 9, in which, when said shaft together with said casing is retracted when said stud has been screwed into said workpiece and is then stopped, said grub screws in said casing abut against the rear ends of said annular recess and take along said jaw housing toward the rear, whereby said return spring is tightened and said locking balls are moved toward the rear along said grooves and thereby pivot said jaws so that their front ends are again opened to disengage from said stud.

11. A stud driver as defined in claim 10, in which when said shaft is further retracted with said collet after the front ends of said jaws have disengaged from said stud, said return spring will be released and will thereby shift said jaw housing with said locking ball relative to said jaws so that said balls will again act upon said jaws to close their front ends.

12. A stud driver as defined in claim 8, in which the wall of said bushing is provided with longitudinal slots so as to render it resilient for clamping a stud when inserted into said bore.

13. A stud driver as defined in claim 8, further comprising a ball bearing connecting said bushing to said guide sleeve so that when said guide sleeve is rotated, the rotation of said bushing will be stopped when the front surface of said bushing engages upon a fixed surface.

14. A stud driver as defined in claim 13, in which said bushing has an inner bottom, said return spring being disposed within said bushing and having one end engaging upon said bottom, and a thin washer interposed between the other end of said spring and the front end surfaces of said jaws.

15. A stud driver as defined in claim 9, in which said drive member forms an element separate from said shaft, and further comprising an adjustable torque control clutch interposed between said shaft and said drive member for determining the torque with which the stud is screwed into said workpiece, said clutch comprising a set of cup springs surrounding an extension of said shaft and surrounded by said casing, rollers within said casing and interposed between the rear end surface of said drive member and the front end of said set of cup springs, and an adjusting ring screwed upon said shaft extension and adjustable in the axial direction of said extension for varying the force exerted by said cup springs upon said rollers and through said rollers upon said drive member.

16. A stud driver as defined in claim 9, further comprising a length compensating device, said device comprising a pressure-responsive compensating spring interposed between said shaft and said drive member, said device being especially suitable when a plurality of said stud drivers each of which includes one of said devices are operated simultaneously by a multiple-spindle machine for screwing a plurality of studs simultaneously into a workpiece.

17. A stud driver as defined in claim 16, in which said casing forms an element separate from said shaft and said shaft has a tubular front end engaging into and axially slidable in said casing, said compensating spring disposed partly within said tubular end and partly within said casing and pressing with one end upon the inner bottom of said tubular end and with the other end upon said drive member, and means for connecting said shaft to said casing so as to be axially slidable but nonrotatable relative to each other.

18. A stud driver as defined in claim 17, in which said drive member also forms an element separate from said shaft, and further comprising an adjustable torque control clutch interposed between said shaft and said drive member for determining the torque with which the stud is screwed into said workpiece, said clutch comprising a set of cup springs surrounding an extension of said shaft and surrounded by said casing, rollers within said casing and interposed between the rear end surface of said drive member and the front end of said set of cup springs, and an adjusting ring screwed upon said shaft extension and adjustable in the axial direction of said extension for varying the force exerted by said cup springs upon said rollers and through said rollers upon said drive member.

19. A stud driver as defined in claim 3 in which said return spring surrounds the shank of said screw and acts with one end against the head of said screw and with its other end against the bottom of said socket.

20. A stud driver comprising a shaft rotatable in one direction and reciprocal in its axial direction, a collet connected to said shaft and comprising a jaw housing coaxial to said shaft, a plurality of elongated jaws within said housing and together extending coaxially to said housing, said jaws having internal thread sections in their inner front ends, locking means nonrotatably connecting said jaws to said housing and being movable by said housing with respect to said jaws, shifting means for shifting said jaws and said housing axially relative to each other from a first starting position in which said jaws are substantially closed to a second open jaw position and back to said first position, said locking means in said first position pressing said threaded ends of said jaws toward each other to a substantially closed position of said ends for permitting one end of a stud to be screwed from the outside into and between said threaded ends and also for permitting the other end of said stud to be screwed for a certain distance into a tapped bore of a workpiece while said jaws are rotated due to the rotation of said shaft and are moved toward the workpiece at least partly due to the forward movement of said shaft, said locking means in said second position when the ends of said stud have been screwed for the required distances into said jaws and into said tapped bore of the workpiece acting upon said jaws so as to spread apart said threaded front ends thereof to said second open position in which, when said collet is being retracted by said shaft from said workpiece, said jaws are fully disengaged from said stud, said shifting means including means for moving said housing and said jaws relative to each other from said second to said first position as soon as said collet has been retracted from said stud independently and separately from the application of forces against said stud driver by said stud so that said locking means again press said threaded ends of said jaws into said starting closed first position.

21. A stud driver as defined in claim 20, wherein the locking means are freely rotatable.

22. A stud driver as defined in claim 20, wherein the locking means are balls.

* * * * *